United States Patent
Lane

(10) Patent No.: US 10,697,658 B2
(45) Date of Patent: Jun. 30, 2020

(54) METHOD AND DEVICE FOR CONTROLLING AN AIR CONDITIONER

(71) Applicant: TADO GMBH, Munich (DE)

(72) Inventor: Westlund Lane, Munich (DE)

(73) Assignee: TADO GMBH, Munich (DE)

(*) Notice: Subject to any disclaimer, the term of this patent is extended or adjusted under 35 U.S.C. 154(b) by 302 days.

(21) Appl. No.: 15/763,189

(22) PCT Filed: Sep. 21, 2016

(86) PCT No.: PCT/EP2016/001581
§ 371 (c)(1),
(2) Date: Mar. 26, 2018

(87) PCT Pub. No.: WO2017/054910
PCT Pub. Date: Apr. 6, 2017

(65) Prior Publication Data
US 2018/0274808 A1    Sep. 27, 2018

(30) Foreign Application Priority Data
Sep. 29, 2015 (GB) .................................. 1517145.7

(51) Int. Cl.
*F24F 11/526* (2018.01)
*F24F 11/30* (2018.01)
(Continued)

(52) U.S. Cl.
CPC ............ *F24F 11/526* (2018.01); *F24F 11/30* (2018.01); *F24F 11/56* (2018.01); *F24F 11/62* (2018.01);
(Continued)

(58) Field of Classification Search
CPC . G05B 15/02; F24F 11/62; F24F 11/56; F24F 11/30
See application file for complete search history.

(56) References Cited

U.S. PATENT DOCUMENTS

| | | |
|---|---|---|
| 2015/0053779 A1 | 2/2015 | Adamek et al. |
| 2016/0210557 A1* | 7/2016 | Nelson ..................... G06F 7/023 |
| 2016/0363336 A1* | 12/2016 | Roth ......................... F24F 11/30 |

FOREIGN PATENT DOCUMENTS

| | | |
|---|---|---|
| CN | 202928021 U | 5/2013 |
| EP | 1220491 A2 | 3/2002 |
| WO | 2015025315 A1 | 2/2015 |

OTHER PUBLICATIONS

PCT/EP2016/001581, International Search Report, dated Jan. 11, 2017, 8 pages.

* cited by examiner

*Primary Examiner* — Vincent H Tran
(74) *Attorney, Agent, or Firm* — Hoffman Warnick LLC

(57) ABSTRACT

The present disclosure relates to a control device for controlling an air conditioner, AC. The control device comprises IR transmission means for emitting control signals to an AC; a microphone for measuring audio acknowledgement signals produced by the AC; and electronic control and evaluation means configured to determine whether sounds measured with the microphone include an audio acknowledgement signal produced by the AC, and being configured to perform a power state determination procedure to determine a power state of the AC. The power state determination comprises: sending a first control signal which is not an on/off control signal and determining whether an audio acknowledgment signal of the AC is subsequently measured, and judging whether the AC is in an off-state depending on whether an audio acknowledgment signal is measured subsequent to the sending of the first control signal. Furthermore a corresponding method for controlling an AC is disclosed.

15 Claims, 2 Drawing Sheets

(51) Int. Cl.
*F24F 11/56* (2018.01)
*F24F 11/62* (2018.01)
*G05B 15/02* (2006.01)
F24F 130/40 (2018.01)
F24F 11/52 (2018.01)

(52) U.S. Cl.
CPC .............. *G05B 15/02* (2013.01); *F24F 11/52* (2018.01); *F24F 2130/40* (2018.01)

METHOD AND DEVICE FOR CONTROLLING AN AIR CONDITIONER

TECHNICAL FIELD

The present invention relates to a method for controlling an air conditioner, AC, and to a control device.

BACKGROUND

Air conditioners, in the following referred to ACs, are widespread devices to cool an environment, such as a room, to a desired temperature. In the context of the present disclosure, also devices able to cool and/or heat an environment, such as HVACs (Heating, ventilation and air conditioning devices) may be regarded within the meaning of an AC.

There is a great variety of different remote controls to control ACs of different manufacturers. Furthermore universal remote controls are known which are configured to control different types of ACs.

However, all such remote controls rely on a user to check whether a desired state of the AC is actually set via the remote control. This is usually unproblematic if a user is in the room that is cooled with the AC. In this case, the user can simply look at the display of the AC to check its state.

However, the applicant has recently envisaged smart control devices dedicated to controlling an AC based on a user behaviour or location, as described in the German patent application with the application number 10 2014 009 414.6 filed on 24 Jun. 2014. Such a smart control device may turn off the AC automatically after the user has left the room and/or the control device may turn on the AC automatically when the user location is close to the room cooled by the AC. In particular in these cases, the user may not be in a position to verify whether the control device properly sets a desired AC state. If, for instance, a turn-off control signal sent by the control device is not properly received by the AC, the AC may remain turned on for hours or days, thus wasting energy in large amounts.

SUMMARY OF THE INVENTION

The present disclosure addresses the problem of providing a method and a device that allow reliable control of an air conditioner.

This problem is solved with a method and a control device.

Preferred embodiments of the invention are defined in the dependent claims and the following description.

According to the invention, a method for controlling an air conditioner, AC, with a control device comprises performing a power state determination procedure to determine a power state of the AC. The power state determination procedure comprises:
  sending a first control signal which is not an on/off control signal with IR (infrared) transmission means of the control device,
  measuring sounds with a microphone of the control device,
  determining with electronic control and evaluation means of the control device whether an audio acknowledgment signal of the AC is measured with the microphone subsequent to the sending of the first control signal (i.e., whether a predefined signal is included in the measured sounds), and
  judging whether or not the AC is in an off-state depending on whether an audio acknowledgment signal is measured subsequent to the sending of the first control signal.

Similarly, according to the invention a control device for controlling an AC comprises
  IR transmission means for emitting control signals to an AC,
  a microphone for measuring audio acknowledgement signals produced by the AC, and
  electronic control and evaluation means configured to determine whether sounds measured with the microphone include an audio acknowledgement signal produced by the AC.

The electronic control and evaluation means are configured to perform a power state determination procedure to determine a power state of the AC, the power state determination procedure comprising:
  sending a first control signal which is not an on/off control signal and determining whether an audio acknowledgment signal of the AC is subsequently measured, and
  judging whether or not the AC is in an off-state depending on whether an audio acknowledgment signal is measured subsequent to the sending of the first control signal.

With the power state determination procedure as described above, it is possible to reliable determine an off-state of an AC that is switched on and off via on/off control signals. The on/off control signals may be power on and power off control signals which are different from each other. However, very often a toggle on/off control signal is used as on/off control signals. A toggle on/off control signal is a control signal that is saved in the control device as a control signal to be used for switching between the power states of the AC, i.e., for turning off as well as turning on an AC. It thus depends on a current power state of the AC whether a toggle on/off control signal is interpreted as a power-off command or a power-on command. This poses serious problems for any control device: As each toggle on/off control signal may change the AC's power state, simply resending a toggle on/off control signal to ensure receipt of the control signal by the AC is not an option. However, if a toggle on/off control signal is not properly received by an AC, a conventional control device falsely assumes a change of the AC's power state. For instance, the AC may remain in an on-state while the conventional control device assumes that it has turned off the AC. Additionally, if the user changes the AC's power state without using the control device (e.g., by pressing a button at the AC's casing), a conventional control device is unaware of this change. If the conventional control device then sends a toggle on/off control signal with the goal to turn off the AC (e.g., in the case of an automatic control based on a user presence in the room with the AC), the AC is indeed turned on.

Aspects of the invention are described with reference to ACs that use on/off control signals and/or an on control signal (to turn on an AC) and an off control signal (to turn off an AC). These aspects may also be understood such that a toggle on/off control signal to switch between the on state and the off state is used as an on/off control signal. A toggle on/off control signal may also serve as both the on control signal and the off control signal mentioned in the following. Similarly, the on/off control signals and the toggle on/off control signal mentioned in this disclosure may also be construed as comprising variants in which a power on control signal and a power off control signal (which are different from another) are used as on/off control signals or are used instead of the toggle on/off control signal.

In particular for an automatic control of an AC, it is beneficial to reliably determine a power state of the AC. This is possible with the power state determination procedure described above. ACs that use a toggle on/off control signal to switch between the power states usually do not react when receiving another signal than a toggle on/off control signal. Furthermore, the invention makes use of the AC's audio acknowledgment signals, i.e. an AC beeps when receiving a control signal. However, if the AC is in an off-state, it typically only beeps upon receipt of a toggle on/off control signal but not upon receipt of any other control signal, e.g. a control signal to increase or decrease a setpoint temperature of the AC.

The judging whether or not the AC is in an off-state depending on whether an audio acknowledgment signal is measured subsequent to the sending of the first control signal may generally be understood such that the judgment depends (solely or among other factors) on whether the audio acknowledgment signal is measured. In a fast-operating variant, an off-state is assumed if no audio acknowledgment signal is measured subsequent to the first control signal. In more complex variants (with even better reliance), an off-state not yet assumed if no audio acknowledgment signal is measured subsequent to the first control signal, but only if further factors apply. In a preferred variant, the power state determination procedure further comprises:

sending a second control signal which is not an on/off control signal with the IR transmission means,
determining with the electronic control and evaluation means whether an audio acknowledgment signal of the AC is measured with the microphone subsequent to the sending of the second control signal,
judging that the AC is in an off-state if an audio acknowledgment signal is neither measured subsequently to the first control signal nor subsequently to the second control signal.

In particular, the control device of the invention may be configured to execute the power state determination procedure which further comprises:

sending a second control signal which is not an on/off control signal and determining whether an audio acknowledgment signal of the AC is subsequently measured, and
judging that the AC is in an off-state if an audio acknowledgment signal is neither measured subsequently to the first nor subsequently to the second control signal.

The AC power state can thus be determined by emitting control signals that are not (toggle) on/off control signals and subsequently measuring whether any audio acknowledgment signals (beeps) are emitted by the AC. For better reliance in the determination of the power state, the control device may emit a second control signal, in particular when no audio acknowledgment signal is measured subsequent to the first control signal of the power state determination procedure. Only if both control signals do not provoke an audio acknowledgment signal, a power-off state is assumed. This provides safety against false judgment in the case that one sent control signal is not properly received by the AC.

The first and second control signals may in particular be setpoint temperature step down signals, as these certainly do not provoke an audio acknowledgment signal of the AC when turned off.

Should a beep be measured following one of the first and second control signals, it may not be judged that the AC is in an off-state. Instead, one or more further control signals may be sent, as described later.

For brevity, the expression "audio acknowledgment signal" is subsequently used tantamount to "beep". However, a "beep" may not be construed as a limitation of the kind of audio signal emitted by the AC after receipt of a control signal.

The infrared (IR) transmission means of the control device may be formed by any means configured to emit different infrared signals. The control device has a database with different infrared signals/control signals for controlling ACs, which can be emitted with the IR transmission means. In general, the IR transmission means may also comprise several distinct units for emitting IR control signals, e.g., in different directions.

The microphone of the control device measures any sounds produced in an environment of the control device. Again, the microphone may be constituted of several microphone units or, preferably, by just one microphone unit.

All parts of the control device described herein, in particular the microphone and the IR transmission means, may be preferably accommodated in one and the same control device housing. This facilitates mounting of the control device by a user without technical skills. However, it is generally also possible that components such as a microphone, IR transmission means or the electronic control and evaluation means are partially or completely arranged outside the housing in which other control device components are accommodated.

The electronic control and evaluation means are in particular configured to analyze sounds measured with the microphone. These control and evaluation means determine whether one or more kinds of predefined audio acknowledgement signals are included in the recorded sounds. This is achieved with known signal processing procedures, which may include frequency analysis and may make use of the known duration of beeps emitted by the AC.

For assessing whether a beep occurs subsequent to sending a control signal, the control and evaluation means determine whether a beep is included in sounds recorded in a certain time frame. This time frame may start with the emission of the respective control signal or slightly afterwards, e.g. the start may lie within 5 or 100 milliseconds after emission of the control signals. The time frame may end between 200 and 1000 milliseconds after emission of the respective control signal, and generally ends before emission of another control signal. It is noted that the sounds may be recorded and analyzed continuously (hence not triggered by the emission of control signals) but a measured beep may be regarded as an acknowledgment of a previously sent control signal only if it occurred within the time frame defined above.

The power state determination procedure may further comprise: judging that the AC is in an on-state if an audio acknowledgement signal is measured subsequently to the first control signal and subsequently to the second control signal. Again, reliance is increased in that only one measured beep does not suffice to assume a power-on state.

If only one beep is measured subsequent to the first or the second control signal, the power state determination procedure may continue emitting control signals to reliably determine the power state. The power state determination procedure thus may further comprise the following step:

if an audio acknowledgement signal is measured subsequently to only one of the first and second control signals, repeating to send further control signals which are not (toggle) on/off control signals and determining whether an audio acknowledgment signal of the AC is measured subsequent to the emission of each of the further control signals until audio acknowledgment signals are measured subsequently to two consecutive control signals, in which case the AC is judged to be in an on-state, or until no audio acknowledgment signals are measured subsequently to two consecutive control signals, in which case the AC is judged to be in an off-state.

A variant of the disclosed method additionally comprises a setpoint temperature calibration procedure. The setpoint temperature of an AC may be regarded as a threshold temperature value; only if a room temperature (measured by the AC) is above this threshold, the AC operates to cool an environment. The setpoint temperature may also be regarded as a desired room temperature, i.e. a temperature of the AC's surrounding. The AC then sets its cooling conditions, such as cooling power and/or fan speed, such that a current room temperature becomes closer to the desired room temperature. As with the power state, knowledge of a current setpoint temperature of an AC is crucial for a correct control via the control device.

The control device may thus perform a setpoint temperature calibration procedure to set a desired setpoint temperature of the AC starting from an initially unknown setpoint temperature (or generally from any setpoint temperature which may or may not be known). The setpoint temperature calibration procedure comprises:

sending a number of temperature step up control signals, wherein the number of temperature step up control signals is high enough to reach a maximum setpoint temperature of the AC regardless of a current setpoint temperature of the AC, determining/calculating the number of temperature steps that a desired setpoint temperature (which may be input by a user) is below the maximum setpoint temperature, sending a number of temperature step down control signals corresponding to the determined number of temperature steps that the desired setpoint temperature is below the maximum setpoint temperature.

With this procedure, the highest possible setpoint temperature is first set. If the highest possible (i.e. maximum) setpoint temperature is reached, emission of any further temperature step up control signals has no effects. The highest possible setpoint temperature can thus be reliably set by sending a number of temperature step up control signals sufficient to reach the highest possible setpoint temperature even when the AC is initially at its lowest possible setpoint temperature.

For instance, the lowest possible setpoint temperature may be 17° C. and the highest possible setpoint temperature may be 30° C. A step between possible setpoint temperatures is usually 1° C. and hence with 13 (or more) temperature step up control signals the 30° C. setpoint temperature can be reached when starting from the 17° C. setpoint temperature or any other setpoint temperature.

In the described setpoint temperature calibration procedure, temperature step up control signals are reached to use a maximum possible setpoint temperature. In principle, temperature step down control signals could instead be used to reach a minimum possible setpoint temperature. Subsequently, temperature step up control signals can be sent to set a desired setpoint temperature. The preceding and following variants of the setpoint temperature calibration procedure, in which first a number of temperature step up control signals are sent and then temperature step down control signals may be sent, shall also be understood as descriptions of variants in which temperature step down control signals are used instead of temperature step up control signals, and temperature step up control signals are used instead of temperature step down control signals. Using the maximum possible setpoint temperature instead of the minimum possible setpoint temperature during the described calibration offers the advantage that the AC is not briefly set to run at its strongest cooling power. Repetitively setting the strongest cooling power may reduce life expectancy of the AC.

The number of temperature step up control signals necessary to reach the highest possible setpoint temperature may be saved in the control device. This number can also be derived from saved values of the highest and lowest possible setpoint temperatures, together with a saved value of the temperature step between neighboring setpoint temperatures. This temperature step is practically always 1°. The procedures described work equally well for ACs using Celsius or Fahrenheit; a step then being either 1° C. or 1° F.

For executing the setpoint temperature calibration procedure, the control and evaluation means may comprise a memory in which the amount of temperature step up control signals needed to reach a maximum setpoint temperature of the AC is saved. The control and evaluation means may then be configured to send at least as many temperature step up control signals as the afore-mentioned amount; determine the number of temperature steps that a desired setpoint temperature is below the maximum setpoint temperature; and send a number of temperature step down control signals corresponding to the determined number of temperature steps that the desired setpoint temperature is below the maximum setpoint temperature.

In principle, knowledge of the maximum setpoint temperature suffices. Knowledge of the minimum setpoint temperature is not necessarily required. The control device may assume a minimum setpoint temperature and may then calculate the above mentioned number of temperature up steps required to reach the maximum setpoint temperature. For better reliance, the AC may use a number of setpoint temperature step up control signals to reach the maximum setpoint temperature, which number is higher than the number derived from an assumed minimum setpoint temperature.

In some cases, the control device monitors whether audio acknowledgment signals are received following each control signal sent during the setpoint temperature calibration procedure. If no beep is determined after a sent control signal, this control signal is sent once more. Hence, the number of temperature step up control signals sent to reach the maximum (highest possible) setpoint temperature is to be understood as the amount of temperature step up control signals for which an audio acknowledgment signal is subsequently measured.

Hence, the setpoint temperature calibration procedure may further comprise: after each control signal sent during the setpoint temperature calibration procedure (thus a control signal which is not a toggle on/off control signal), determining with the electronic control and evaluation means whether an audio acknowledgment signal of the AC is measured with the microphone subsequent to each of the temperature step up control signals or the temperature step down control signals sent during the setpoint temperature calibration procedure, and resending a control signal for which no audio acknowledgment signal is measured.

Similarly, toggle on/off control signals for which no audio acknowledgment signals are measured may be resent. That means, the control device may run an AC power state switching procedure in which a toggle on/off control signal is sent to turn on or turn off the AC. The electronic control and evaluation means may determine whether an audio acknowledgment signal of the AC is measured with the microphone subsequent to the toggle on/off control signal. Is this not the case, the toggle on/off control signal may be resent. It may occur that the beep detection does not function properly (e.g. due to a failure of the microphone, due to high noise or due to a malfunction in the AC's emission of audio acknowledgement signals). In a preferred variant, the AC power switching procedure stops and beep detection is deemed corrupt if three (or more general: any odd number of three or more) consecutive toggle on/off control signals are sent without any beep being subsequently measured. With an odd number of sent toggle on/off control signals, the AC's power state is switched as desired, assuming that everything but the beep detection works. If beep detection is deemed corrupt, for any following sent control signals (in particular during the setpoint temperature calibration procedure) the steps of determining whether a beep is detected after a sent control signal, and possibly resending a control signal, are omitted.

For the above described ends, a power state switching procedure may be performed, comprising:

sending a first toggle on/off control signal with the IR transmission means and determining whether an audio acknowledgment signal is measured with the microphone subsequent to the first toggle on/off control signal, sending a second toggle on/off control signal if no audio acknowledgment signal is measured subsequent to the first toggle on/off control signal, and determining whether an audio acknowledgment signal is measured subsequent to the second toggle on/off control signal, repeating the sending of a toggle on/off control signal if no audio acknowledgment signals are measured for a predefined number such that a total amount of consecutively sent toggle on/off control signals is an odd number.

Turning back to the setpoint temperature calibration procedure, the control device may include a memory with the highest and lowest possible setpoint temperatures for many models of ACs. In a selection mode run before the setpoint temperature calibration procedure, a user may then select his AC model, and the control device may then use the corresponding highest and lowest possible setpoint temperatures.

Similarly, different AC models may require different IR signals for a specific control signal (e.g. for a temperature step up control signal). The control device may thus comprise a memory in which for different AC models a respective set of IR signals for the described control signals is saved. A user may select his AC model and the control device may then use the respectively saved IR signals.

Alternatively or additionally, the control device may offer an IR signal learning mode. In this mode, a user may send IR signals with a remote control of his AC to the control device. The control device records these IR signals and uses such signals for the emission of control signals in the power mode determination procedure and the setpoint temperature calibration procedure.

As mentioned above, the maximum and minimum setpoint temperatures may be saved in a memory of the control device (e.g., for different selectable AC models and/or via a user input) and knowledge of these values is used in the setpoint temperature calibration procedure: For determining the number of temperature step up control signals used for reaching the maximum setpoint temperature of the AC, the control device may comprise a non-volatile memory in which a maximum setpoint temperature and a minimum setpoint temperature for the AC to be controlled are saved; the temperature difference between the maximum and minimum setpoint temperatures is calculated; and the numerical value of said difference (or any value higher than this difference) is deployed as the number of temperature step up control signals used for reaching the maximum setpoint temperature of the AC.

The setpoint temperature calibration procedure may further comprise the step of: interrupting the setpoint temperature calibration procedure if no audio acknowledgment signal is measured subsequent to a predefined plurality of consecutive control signals (e.g. four consecutive control signals), in which case a toggle on/off control signal is sent or the power state determination procedure is performed, and if an off-state of the AC is determined, a toggle on/off control signal is sent, and the setpoint temperature calibration procedure is then restarted.

The first and second control signals sent during the power state determination procedure may in principle be any control signals other than a toggle on/off control signal. It may be preferable that these control signals are temperature step up control signals. If the AC is judged to be in an on-state (i.e., in the case that two beeps are measured subsequent to the two control signals), then the sent first and second control signals are counted as two control signals of the number of temperature step up control signals to be sent during the setpoint temperature calibration procedure, in particular if the setpoint temperature calibration procedure is performed immediately following the power state determination procedure. In this way the first and second control signals are used for both the power state determination procedure and the setpoint temperature calibration procedure. Thus the total amount of sent controls signals and the required time are reduced. The two procedures thus do not need to be seen strictly separated as they may be performed partially simultaneously.

While the control device of the invention is able to reliably adjust an AC, a user may interfere. For instance, a user may enter a control command with another remote control of the AC, or may enter a control command directly via buttons at the AC. In such cases, the power and setpoint temperature state of the AC is no longer known to the control device. The power state determination procedure and/or the setpoint temperature calibration procedure has to be rerun. However, these procedures should not be executed unnecessarily often. It is thus useful to detect when a user has entered a control command without using the inventive control device. This is achieved by determining if audio acknowledgment signals are measured without a control signal being previously sent. Such an audio acknowledgment signal is referred to as a rogue beep. In one preferred variant, a rogue beep detection mode is performed, comprising:

constantly measuring sounds with the microphone, determining whether an audio acknowledgment signal of the AC is measured, if an audio acknowledgment signal is measured without a control signal being previously sent via the IR transmission means, judging a rogue beep has been detected and judging a state of the AC to be unknown (i.e. the power state and/or the setpoint temperature are judged to be unknown). In one variant, the power state and the setpoint temperature may also be judged unknown following the detection of a rogue beep. Alternatively, it may be preferred to do not judge the power state to be unknown following a rogue beep. This has the advantage that a power state determination procedure will be avoided and thus time saved. Should the power state have changed upon determination of the rogue beep, this power state change can be detected in that future sent setpoint temperature up/down control signals do not provoke a beep. In particular, should two (or more) consecutive setpoint temperature up or down control signals do not lead to detection of a subsequent beep, the power state may be judged to be off.

The rogue beep detection mode may be executed constantly, in particular during execution of the power state determination procedure or the setpoint temperature calibration procedure. Alternatively, only when these procedures are not executed, the rogue beep detection mode may be executed. This avoids endless repetitions of a calibration procedure.

In one variant of the invention, the power state determination procedure is restarted if a rogue beep has been detected while performing the power state determination procedure. Additionally or alternatively, if a rogue beep has been detected while performing the setpoint temperature calibration procedure: the setpoint temperature calibration procedure may be restarted, or the setpoint temperature calibration procedure may be stopped, the power state determination procedure may be executed and then the setpoint temperature calibration procedure may be executed.

If a rogue beep has been detected while neither the power state determination procedure nor the setpoint temperature calibration procedure is performed: A start of the power state determination procedure or the setpoint temperature calibration procedure may be delayed until a change of the state of the AC is to be set. This accounts for the circumstance that a user may have switched the AC's state deliberately (with another remote control or directly at the AC), and there is hence no need to change the AC's state directly afterwards with the inventive control device. Hence, the power state determination procedure and the setpoint temperature calibration procedure may not be started directly after detection of a rogue beep, but when a change of the state of the AC is to be set after detection of a rogue beep, the setpoint temperature calibration procedure is performed, and preferably the power state determination procedure is performed prior to performing the setpoint temperature calibration procedure.

The control device of the invention may also make use of the circumstance that a setpoint temperature commonly remains constant when the AC is turned off and back on again. In such a case, it is not necessary to run the setpoint temperature calibration procedure. Hence, if a setpoint temperature is judged to be known and then the AC is turned off with the control device, and if a desired setpoint temperature is subsequently to be set, then no setpoint temperature calibration procedure, and in some variants no power state determination procedure, is performed prior to sending an on control signal (in particular a toggle on/off control signal) and a respective number of temperature up control signals or temperature down control signals to change the state of the AC from the setpoint temperature judged to be known to the desired setpoint temperature to be set.

In other words, if: A) an AC power state is judged to be on and a certain setpoint temperature is set, a toggle on/off control signal is sent and subsequently an audio acknowledgement signal is measured, and if: B) an on-state of the AC and a desired setpoint temperature are to be set, and no rouge beep is detected while commencing from A) to B), then no setpoint temperature calibration procedure, and in some variants no power state determination procedure, is performed prior to sending a toggle on/off control signal and a respective number of temperature up or down control signals to change the state of the AC from the setpoint temperature of A) to the desired setpoint temperature of B).

The desired power state and setpoint temperature may be communicated to the control device or may be generated by the control device in principally arbitrary ways.

For instance, the control device may comprise a user interface (such as a touch screen) to allow a user entering a desired power state and/or setpoint temperature. Furthermore, the control device may generate the desired power state and setpoint temperature based on measured or received information, such as information on a user location. The control device may also receive AC setting commands from a smartphone. To this end the control device may comprise wireless transmission means for receiving an AC setting command sent from a smartphone. The electronic control and evaluation means may be configured to determine a desired power state and a desired setpoint temperature based on a received AC setting command.

If the AC is to be turned off, the control device will send an off control signal, in particular a toggle on/off control signal. To verify that the AC is indeed turned off, the control device will now send at least one control signal which is not an on/off control signal (in particular not a toggle on/off control signal) and will measure whether a beep occurs. Only if no beep is now measured, the AC is believed to be turned off. If, on the other hand, a beep is measured, this means that the AC has received the control signal which is not an on/off control signal and thus is not turned off yet. Hence, another off control signal, in particular another toggle on/off control signal, will be sent and the above procedure of subsequently sending at least one control signal which is not an on/off control signal will be repeated.

In a similar variant, the power state detection mode may always be executed after a (toggle) on/off control signal for turning off the AC is emitted. Emission of a (toggle) on/off control signal for turning off the AC is repeated if the subsequent power state detection mode results in the AC being regarded to be in an on-state.

The control device of the invention may also be configured to control other ACs that do not use toggle on/off control signals. Hence, based on a user selection on a currently used AC, the control device may operate to emit power-on and power-off control signals which differ from one another, instead of emitting the described toggle on/off control signals.

Furthermore, some ACs may be designed to use absolute setpoint temperature control signals instead of setpoint temperature step up or down control signals. This means, there may be different control signals for each possible setpoint temperature, and the current or previously set setpoint temperature does not influence which setpoint temperature will be set following an absolute setpoint temperature control signal. The control device may thus offer an option to use such absolute setpoint temperature control signals, which are saved in a memory of the control device.

For instance, the user may submit information on his AC model to the control device, and based on this information the control device may select to use either the toggle on/off control signal or two separate power on and power off control signals, and the control device may select to use either the temperature step up and down control signals or the absolute setpoint temperature control signals.

Regardless of this selection, the described measuring of beeps applies, meaning that a control signal is resent if no beep is measured.

The electronic control and evaluation means are configured to perform all method steps described herein, in particular the power state determination procedure and the setpoint temperature calibration procedure. The method steps shall thus also be seen as features of the inventive control device.

A better understanding of the invention and various other features and advantages of the invention will become readily apparent by the following description in connection with the schematic drawings, which are shown by way of example only, and not limitation.

DETAILED DESCRIPTION OF THE DRAWINGS

Figure 1:
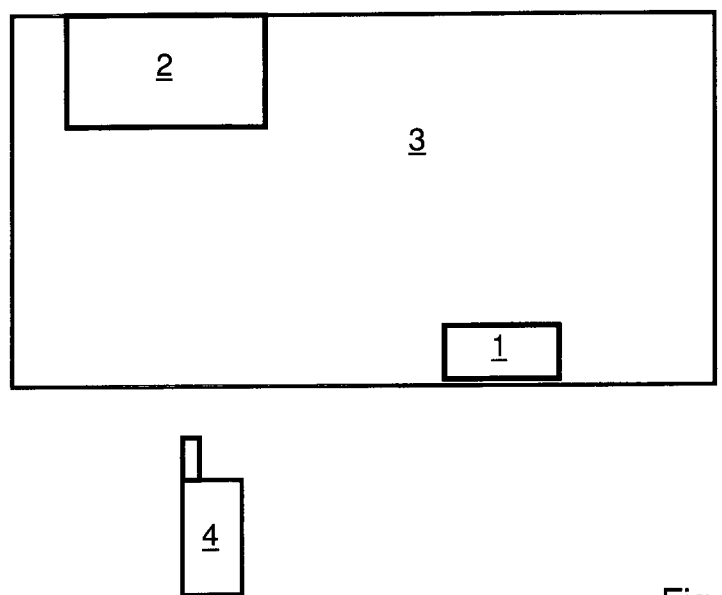
FIG. 1: shows a diagram for illustrating an embodiment of the control device of the invention.

FIG. 1 depicts schematically a room 3 in which an air conditioner, AC 2, is located. The AC 2 is controlled with a control device 1 of the invention. The control device 1 may be arranged in the same room 3.

The control device 1 comprises IR transmission means for sending infrared control signals to the AC 2. The AC 2 sets its power mode (on or off) and its setpoint temperature according to received control signals. The setpoint temperature may indicate a desired room temperature. Depending on a current room temperature measured by the AC 2 and depending on the setpoint temperature, the AC 2 adjusts its cooling settings (e.g., cooling power, fan speed, etc.).

A user may enter a desired AC setting directly via a user interface (such as a touchscreen, buttons or a wheel) at the control device 1.

Alternatively, the user may use a smartphone 4 to enter desired AC settings. The smartphone 4 then sends the corresponding information to the control device 1, which in turn controls the AC 2 accordingly. Generally, any computer input device may be used instead of the smartphone 4, e.g. a personal computer, a laptop computer or any handheld computer device such as a tablet computer.

The control device 1 comprises wireless communication means, such as a WiFi transmitter, to communicate with the smartphone 4 and other devices. Electronic control and evaluation means of the control device 1 are configured to command the IR transmission means to emit control signals depending on received information, in particular information directly input at the control device 1 or received with the wireless communications means. The received information may also originate from a remote server, which may analyse user behaviour and send information depending on the user behaviour (such as a user location) to the control device 1.

As indicated in FIG. 1, a user may enter a desired AC state with a smartphone 4 that is outside the room 3. In particular in such a case, the user cannot immediately check whether the control device 1 correctly alters the state of the AC 2. Therefore, the control device 1 should be configured to verify the AC's state. This is even more important when the AC 2 shall be controlled automatically based on the user behaviour.

The control device 1 of the invention is configured to determine a power state of the AC 2 as well as to reliably set a desired setpoint temperature. The procedures/methods performed to this end with the electronic control and evaluation means of the control device 1 are schematically illustrated in FIG. 2.

Figure 2:
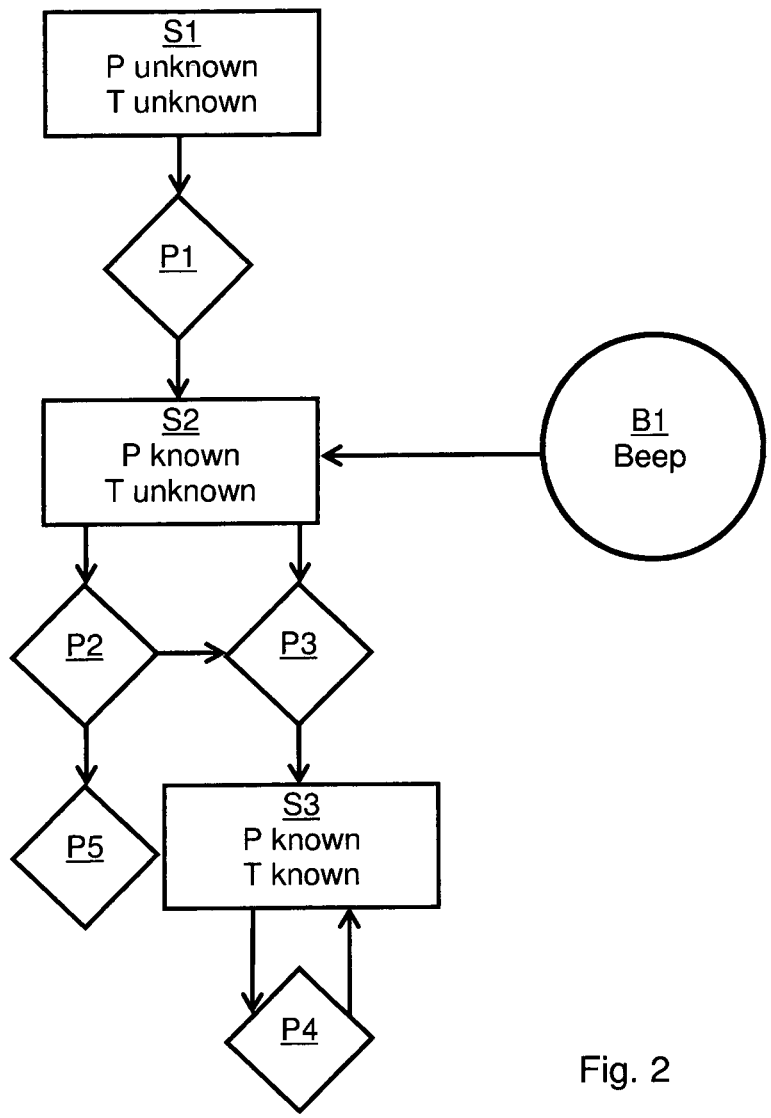
FIG. 2: shows a diagram for illustrating an embodiment of the method of the invention.

FIG. 2 is a flow chart that shows the steps of the method of the invention which is carried out with the control device of FIG. 1.

Initially, a state of the AC to be controlled is unknown. This is illustrated by state S1 in which a power state of the AC is unknown (P unknown) and a setpoint temperature of the AC is unknown (T unknown). State S1 may occur when the control device is started.

The control device then starts a power determination procedure P1 to determine a current power state of the AC. In procedure P1, the control device emits an infrared control signal (first control signal) which is not an on/off control signal. The on/off control signal may in particular be a toggle on/off control signal which is a command saved in the control device as a control signal that switches a power state of the AC between on and off. The following description makes reference to toggle on/off control signals. However, the invention shall be understood as comprising similar variants in which instead of the described toggle on/off control signal, distinct power on and power off control signals are used. In procedure P1 the control device emits any control signal other than an on/off control signal, such as a setpoint temperature step up control signal or a setpoint temperature step down control signal to change the setpoint temperature.

Following the emission of this control signal, a microphone of the control device measures whether any audio acknowledgment signal, in the following referred to as a beep, is emitted by the AC. The AC will beep in response to a control signal which is not a toggle on/off control signal if the AC is currently turned on.

Hence, measuring no beep hints at an off-state while a beep hints at an on-state.

However, it may occasionally happen that an infrared control signal of the control device is not properly received by the AC and hence the AC does not beep although it is turned on. Furthermore, the AC may beep but due to background noise, the beep is not recognized with the microphone. Better reliance is thus required.

To this end the control device may emit a second control signal, which is again not a toggle on/off control signal and may be identical to the first control signal. Again the control device will determine whether the AC beeps.

If beeps are measured after emission of the first control signal and the second control signals, the AC is judged to be turned on. If no beeps are measured after emission of the first control signal and the second control signals, the AC is judged to be turned off. If a beep is measured only after one of the first and second control signals, then another control signal similar to the first or second control signal is emitted. Only when two consecutive control signals have the same outcome (two beeps or twice no beep), the power state of the AC is judged to be known, namely on or off. In this case, the method continues to state S2, which indicates that the power state is known (P known) while the setpoint temperature is not yet known (T unknown).

In simpler but faster variants, only the first control signal (and no second control signal) may be used to judge whether the AC is on or off. In such variants, the AC may be judged to be on if a beep is measured following the first control signal, and the AC may be judged to be off if no beep is measured following the first control signal.

If the power state in state S2 is off and the desired power state is "on", then the control device will emit a toggle on/off control signal indicated as procedure P2. If a beep is subsequently measured, the method continues to procedure P3. If no beep is subsequently measured, emission of a toggle on/off control signal is repeated, and the method continues to P3 if a beep is then measured.

If the power state in state S2 is "on" and the desired power state is "on", the method will directly continue with procedure P3 after procedure P1.

P3 indicates that a setpoint temperature calibration procedure is run. This is necessary to set a desired setpoint temperature starting from any arbitrary (unknown) setpoint temperature. The control device has a memory in which a setpoint temperature step up control signal and a setpoint temperature step down control signal are saved. These control signals do not represent absolute setpoint temperature values but only a change in the setpoint temperature. Hence a current setpoint temperature state of the AC influences which setpoint temperature will be set following such control signals.

Each AC has a range of selectable setpoint temperatures. These possible setpoint temperatures define a maximum number of setpoint temperature step up control signals required to reach the highest possible setpoint temperature. For instance, if the possible selectable setpoint temperatures cover the range of 16° C. to 28° C. in 1° C. steps, then 12 setpoint temperature step up control signals always suffice to reach the highest possible setpoint temperature of 28° C.

This number of setpoint temperature step up control signals required to reach the highest possible setpoint temperature from any arbitrary current setpoint temperature is saved in the control device. The number may initially either be input by a user of the user may input his AC model and the control device may select a number saved for this AC model.

As a first step of procedure P3, the control device will emit the afore-mentioned number of setpoint temperature step up control signals required to reach the highest possible setpoint temperature. It is also possible to emit even more setpoint temperature step up control signals but this increases reliability only marginally.

After these setpoint temperature step up control signals, the control device may safely assume that the current setpoint temperature of the AC is the highest possible. As a second step, the control device may now emit a number of setpoint temperature step down control signals to reach a desired setpoint temperature. For instance, if the desired setpoint temperature is 8° C. (or more generally X degrees) below the highest possible setpoint temperature, the control device may now emit 8 (or more generally an amount of X) setpoint temperature step down control signals.

It is noted that the setpoint temperature calibration procedure also works if temperature step down control signals are used in the first step described above to reach a minimal setpoint temperature, and temperature step up control signals are used in the second step described above.

After performing the procedure P3, the power state as well as the setpoint temperature of the AC are known, which is symbolized by state S4 in FIG. 2.

If a change of the setpoint temperature is desired starting from state S4, it is not necessary to perform the procedures P1 or P3. Instead, procedure P4 is then performed. In this procedure, the corresponding control signals to reach a desired state starting from the known state S4 are sent. For instance, in order to increase the setpoint temperature by 3 degrees, three setpoint temperature step up control signals are sent. As during the other procedures, if no beep is subsequently measured, emission of the previous control signal is repeated. After procedure P3 the AC state is still known, meaning that state S4 follows after P3.

Procedure P4 is also executed if the desired state of the AC is a power-off state. If the AC is turned off with a toggle on/off control signal, the AC will save its setpoint temperature, and will restore this setpoint temperature after the next turning on, meaning that the AC state (power state and setpoint temperature) is still known when the AC is turned off.

However, knowledge of the AC state is not certain if a beep is measured without a control signal having been sent. Such a rogue beep may be due to a user having changed the AC state directly at the AC without using the control device of the invention. In this case (event B1 in FIG. 2) the current state switches to S2. If now any changes in the AC state are desired, the method continues from state S2 with procedure P2 or P3, as described above (and not with procedure P4).

Should none of several (e.g. two or three) consecutive temperature step up or down control signals during procedure P3 lead to detection of a subsequent beep, the power state of the AC 2 may be off and falsely assumed to be on. In this case, a toggle on/off command may be sent (in particular procedure P2 may be executed) and then procedure P3 may be restarted.

In an alternative embodiment, the above referenced detection of a rogue beep may lead to switching the current state to S1 instead of S2.

Another issue may arise if the detection of beeps does not work for a prolonged time period. For instance, the AC's load speaker that generates the beeps may be damaged. In such a case it should be avoided that the control device endlessly continues to send toggle on/off control signals in an effort to turn on the AC, as so far described with reference to procedure P2. Hence, it may be preferable that the control device stops emission of consecutive toggle on/off control signals after a predefined number of repetitions, such as two (meaning three toggle on/off control signals in total). In this event, the procedure continues from P2 to P5. Procedure P5 is identical to P3 with the difference that measuring beeps is omitted (as this presently does not seem to work) and thus resending control signals (if no beep is measured) is also omitted.

The method of the invention may start at S1 and with executing procedure P1 when the control device is turned on (and has thus so far no information on the AC's state), and/or after a rogue beep, and/or after a predetermined time, for instance after 5 or 12 hours. This offers an additional security measure to ensure that the AC is not unintentionally turned on for many hours or even days.

The control device of the invention thus allows to reliable control an AC without the need of manual verification by a user. Hence an automatic control becomes feasible without the risk of long durations in which an undesired AC state is unintentionally set.

The invention claimed is:

1. A method for controlling an air conditioner (AC), with a control device, the method comprising:
   performing a power state determination procedure to determine a power state of the AC, the power state determination procedure comprising:
       sending a first control signal which is not an on/off control signal with IR transmission means of the control device, measuring sounds with a microphone of the control device, determining with electronic control and evaluation means of the control device whether an audio acknowledgment signal of the AC is measured with the microphone subsequent to the sending of the first control signal, and judging whether or not the AC is in an off-state depending on whether an audio acknowledgment signal is measured subsequent to the sending of the first control signal.

2. The method of claim 1, wherein the power state determination procedure further comprises:

sending a second control signal which is not an on/off control signal with the IR transmission means, determining with the electronic control and evaluation means whether an audio acknowledgment signal of the AC is measured with the microphone subsequent to the sending of the second control signal, and judging that the AC is in an off-state if an audio acknowledgment signal is neither measured subsequently to the first control signal nor subsequently to the second control signal.

3. The method of claim 2, wherein the power state determination procedure further comprises:

judging that the AC is in an on-state if an audio acknowledgement signal is measured subsequently to the first control signal and subsequently to the second control signal.

4. The method of claim 2, wherein the power state determination procedure further comprises:

if an audio acknowledgement signal is measured subsequently to only one of the first and second control signals, repeating to send control signals which are not on/off control signals and determining whether an audio acknowledgment signal of the AC is measured subsequently to each control signal, until audio acknowledgment signals are measured subsequently to two consecutive control signals, in which case the AC is judged to be in an on-state, or until no audio acknowledgment signals are measured subsequently to two consecutive control signals, in which case the AC is judged to be in an off-state.

5. The method of claim 1, further comprising:

performing a setpoint temperature calibration procedure to set a desired setpoint temperature of the AC starting from an initially unknown setpoint temperature, the setpoint temperature calibration procedure comprising:

sending a number of temperature step up control signals, wherein the number of temperature step up control signals is high enough to reach a maximum setpoint temperature of the AC regardless of a current setpoint temperature of the AC, determining the number of temperature steps that a desired setpoint temperature is below the maximum setpoint temperature, and sending a number of temperature step down control signals corresponding to the determined number of temperature steps that the desired setpoint temperature is below the maximum setpoint temperature.

6. The method of claim 5, wherein for determining the number of temperature step up control signals used for reaching the maximum setpoint temperature of the AC, the control device comprises a non-volatile memory in which a maximum setpoint temperature and a minimum setpoint temperature for the AC to be controlled are saved, the temperature difference between the maximum and minimum setpoint temperatures is calculated, the numerical value of said difference is deployed as the number of temperature step up control signals used for reaching the maximum setpoint temperature of the AC.

7. The method of claim 5, wherein the setpoint temperature calibration procedure (P3) further comprises:

after each sent control signal:

determining whether an audio acknowledgment signal of the AC is measured with the microphone subsequent to each of the control signals sent during the setpoint temperature calibration procedure, and resending a control signal for which no audio acknowledgment signal is measured.

8. The method of claim 5, wherein the setpoint temperature calibration procedure further comprises:

interrupting the setpoint temperature calibration procedure if no audio acknowledgment signal is measured subsequent to a predefined plurality of consecutive control signals, in which case:

an on/off control signal is sent or the power state determination procedure is performed, and if an off-state of the AC is determined, an on/off control signal is sent, and the setpoint temperature calibration procedure is then restarted.

9. The method of claim 5, wherein:

the first and second control signals sent during the power state determination procedure are temperature step up control signals, and if the AC is judged to be in an on-state, the sent first and second control signals are counted as two control signals of the number of temperature step up control signals to be sent during the setpoint temperature calibration procedure.

10. The method of claim 1, further comprising:

performing a rogue beep detection mode, comprising:

constantly measuring sounds with the microphone, determining whether an audio acknowledgment signal of the AC is measured, and if an audio acknowledgment signal is measured without a control signal being previously sent via the IR transmission means, judging a rogue beep has been detected and judging a state of the AC to be unknown.

11. The method of claim 10, wherein if a rogue beep has been detected while neither the power state determination procedure nor the setpoint temperature calibration procedure is performed, the method further comprises:

waiting with starting the power state determination procedure or the setpoint temperature calibration procedure until a change of the state of the AC is to be set.

12. The method of claim 1, wherein if the AC is to be turned off when starting from a power state of the AC which is known to be an on-state, the method further comprises:

sending an off control signal from the control device, sending, from the control device, one or more control signals which are not on/off control signals and determining whether audio acknowledgment signals are subsequently measured to verify that the AC has thus been turned off, and if an audio acknowledgment signal is measured subsequent to the one or more control signals which is not an on/off control signal, judging, by the control device, that the AC is not yet turned off and emitting another off control signal.

13. The method of claim 12, wherein if:

A) a setpoint temperature is judged to be known and then the AC is turned off with the control device, and B) the AC is then to be turned on and a desired setpoint temperature is to be set, then:

no setpoint temperature calibration procedure, and no power state determination procedure, is performed prior to sending an on control signal and a respective number of temperature up control signals or temperature down control signals to change the state of the AC from the setpoint temperature of A) to the desired setpoint temperature of B).

14. A control device for controlling an air conditioner (AC) comprising

IR transmission means for emitting control signals to the AC, a microphone for measuring sounds, and electronic control and evaluation means configured to determine whether sounds measured with the microphone include an audio acknowledgement signal produced by the AC, wherein the electronic control and evaluation means are configured to perform a power state determination procedure to determine a power state of the AC, the power state determination procedure comprising:

sending a first control signal which is not an on/off control signal and determining whether an audio acknowledgment signal of the AC is subsequently measured, and judging whether or not the AC is in an off-state depending on whether an audio acknowledgment signal is measured subsequent to the sending of the first control signal.

15. The control device of claim 14, further comprising wireless transmission means for receiving an AC setting command sent from a smartphone, the electronic control and evaluation means being configured to determine a desired power state and a desired setpoint temperature based on a received AC setting command, the electronic control and evaluation means being configured to perform the power state determination procedure and a setpoint temperature calibration procedure for setting the desired power state and the desired setpoint temperature.

* * * * *